US010425890B2

(12) United States Patent
Bishop, Jr. et al.

(10) Patent No.: US 10,425,890 B2
(45) Date of Patent: Sep. 24, 2019

(54) LOW POWER MODE IN A SATELLITE-BASED BROADCAST DATA SERVICE

(71) Applicant: HARRIS CORPORATION, Melbourne, FL (US)

(72) Inventors: James William Bishop, Jr., Colorado Springs, CO (US); Corey Alan Miller, Phoenix, AZ (US); Thomas Russell Topping, Phoenix, AZ (US)

(*) Notice: Subject to any disclaimer, the term of this patent is extended or adjusted under 35 U.S.C. 154(b) by 0 days.

(21) Appl. No.: 15/444,854

(22) Filed: Feb. 28, 2017

(65) Prior Publication Data
US 2017/0171808 A1 Jun. 15, 2017

Related U.S. Application Data

(62) Division of application No. 14/726,416, filed on May 29, 2015, now Pat. No. 9,622,168.

(51) Int. Cl.
*H04B 7/185* (2006.01)
*H04W 52/02* (2009.01)
(Continued)

(52) U.S. Cl.
CPC .... *H04W 52/0203* (2013.01); *H04B 7/18523* (2013.01); *H04H 20/426* (2013.01); *H04H 20/74* (2013.01); *H04H 40/90* (2013.01); *H04H 60/06* (2013.01); *H04W 52/0216* (2013.01); *H04W 72/005* (2013.01); *Y02D 70/00* (2018.01); *Y02D 70/446* (2018.01)

(58) Field of Classification Search
CPC . H04W 52/0203; H04W 72/005; H04H 40/90
See application file for complete search history.

(56) References Cited

U.S. PATENT DOCUMENTS 5,410,728 A 4/1995 Berlinger et al.
5,574,968 A 11/1996 Olds et al.
(Continued)

OTHER PUBLICATIONS http://www.reuters.com/finance/stocks/companyProfile?symbol=IRIDQ.PK,[downloaded—Mar. 10, 2015],pp. 1-2.
(Continued)

*Primary Examiner* — MD K Talukder
(74) *Attorney, Agent, or Firm* — Watson IP Group, PLC; Dan Fiul

(57) ABSTRACT

A satellite system controller for a satellite system can comprise a receiving module, an interval selector, an epoch selector, and a scheduler. The receiving module can receive, from a transmission originator device, a set interval request message requesting the satellite system controller set a transmission interval and an epoch time for a satellite receiver, the transmission interval being an amount of time the satellite receiver is to remain in a sleep mode between expected transmissions and the epoch time being an instant at which the satellite receiver is to expect a satellite transmission. The interval selector can determine, based on the transmission interval, a sleep mode cycle for the satellite receiver. The epoch selector can select the epoch time according to the sleep mode cycle and the scheduler can schedule the satellite transmission with the satellite system at approximately the epoch time and according to the sleep mode cycle.

14 Claims, 7 Drawing Sheets

(51) Int. Cl.

| | | |
|---|---|---|
| *H04H 40/90* | (2008.01) | |
| *H04W 72/00* | (2009.01) | |
| *H04H 20/42* | (2008.01) | |
| *H04H 20/74* | (2008.01) | |
| *H04H 60/06* | (2008.01) | |

(56) References Cited

U.S. PATENT DOCUMENTS

| | | | |
|---|---|---|---|
| 5,603,079 A | 2/1997 | Olds et al. | |
| 5,613,194 A | 3/1997 | Olds et al. | |
| 5,721,534 A * | 2/1998 | Olds | H04B 7/18567 340/2.1 |
| 5,905,443 A * | 5/1999 | Olds | H04B 7/18567 340/7.27 |
| 6,282,178 B1 * | 8/2001 | Noerpel | H04B 7/18517 370/316 |
| 9,198,126 B2 * | 11/2015 | Topping | H04B 7/18543 |
| 9,622,168 B2 * | 4/2017 | Bishop, Jr. | H04W 52/0203 |
| 10,181,896 B1 * | 1/2019 | Swift | H04W 52/0216 |
| 2002/0044763 A1 * | 4/2002 | Wehmeyer | H04N 7/0887 386/291 |
| 2003/0043761 A1 * | 3/2003 | Hladik | H04B 7/212 370/319 |
| 2005/0021678 A1 * | 1/2005 | Simyon | H04L 29/06 709/219 |
| 2005/0275308 A1 * | 12/2005 | Lagergren | G01F 23/2968 310/317 |
| 2005/0284218 A1 * | 12/2005 | Lagergren | G01F 23/0076 73/290 V |
| 2006/0122667 A1 * | 6/2006 | Chavan | A61M 5/14276 607/60 |
| 2008/0117103 A1 * | 5/2008 | Wang | G01S 19/34 342/357.74 |
| 2008/0146219 A1 * | 6/2008 | Habermas | H04B 7/18523 455/428 |
| 2009/0025474 A1 * | 1/2009 | Lagergren | G01F 23/0069 73/290 V |
| 2009/0146839 A1 * | 6/2009 | Reddy | G01D 4/004 340/870.02 |
| 2010/0068993 A1 * | 3/2010 | Khan | H04B 7/1853 455/12.1 |
| 2010/0122143 A1 * | 5/2010 | Lee | H03M 13/1117 714/752 |
| 2011/0051665 A1 * | 3/2011 | Huang | G01S 5/0027 370/328 |
| 2011/0296473 A1 * | 12/2011 | Babic | H04N 21/21 725/87 |
| 2011/0296474 A1 * | 12/2011 | Babic | H04N 21/21 725/87 |
| 2012/0017247 A1 * | 1/2012 | Hodson | H04B 7/18523 725/67 |
| 2014/0113544 A1 * | 4/2014 | Topping | H04B 7/18543 455/3.01 |
| 2016/0353372 A1 * | 12/2016 | Bishop, Jr. | H04W 52/0203 |
| 2017/0171808 A1 * | 6/2017 | Bishop, Jr. | H04W 52/0203 |

OTHER PUBLICATIONS

The Global Network: Satellite Constellation, Jul. 2012 pp. 1-2. https:/fwww.iridium.com/fSearchResults.aspx?q=paging, [downloaded—Mar. 10, 2015], p. 1.

* cited by examiner

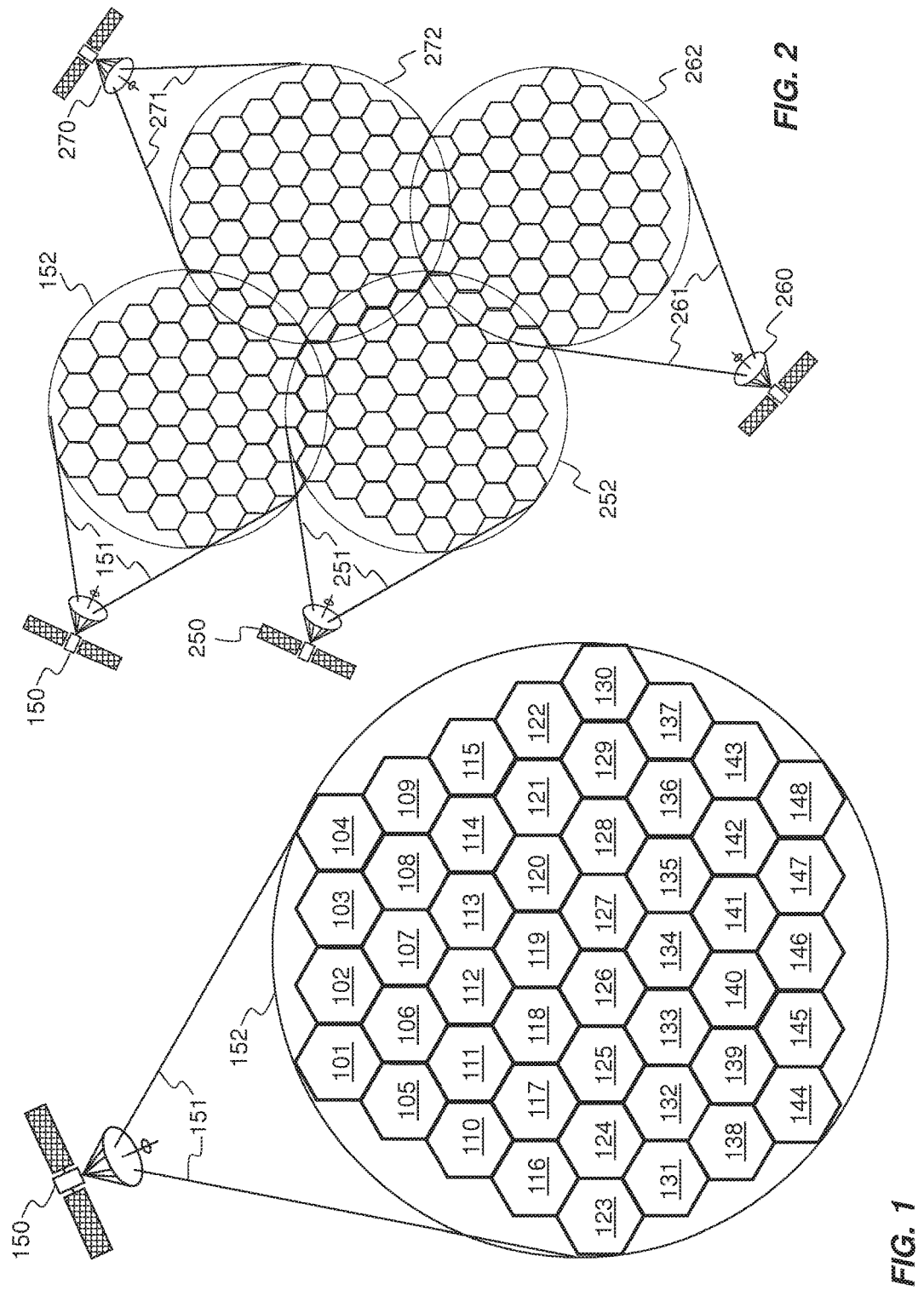

| BROADCAST DELIVERY REQUEST STRUCTURE 610 | | | |
|---|---|---|---|
| MESSAGE HEADER & TYPE 611 | GROUP IDENTIFIER 612 | DELIVERY TIME 613 | DELIVERY AREA 614 |
| BROADCAST INFORMATION PAYLOAD 615 | | | |

| BROADCAST REQUEST ACCEPTED STRUCTURE 630 | | |
|---|---|---|
| MESSAGE HEADER & TYPE 631 | RESULT CODE 632 | ESTIMATED TRANSMISSION TIME 633 |

| BROADCAST DELIVERY COMPLETE STRUCTURE 660 | | |
|---|---|---|
| MESSAGE HEADER & TYPE 661 | RESULT CODE 662 | ACTUAL TRANSMISSION TIME 663 |

*FIG. 6C*

| BROADCAST BURST STRUCTURE 700 | | |
|---|---|---|
| GROUP HEADER 701 | CONTENT HEADER 702 | CONTENT PAYLOAD 703 |

| GROUP HEADER STRUCTURE 710 | | |
|---|---|---|
| GROUP ADDRESS 711 | GROUP INTERVAL 712 | GROUP EPOCH 713 |

| CONTENT HEADER STRUCTURE 720 | |
|---|---|
| BURST TYPE 721 | SEQUENCING & SEGMENTATION CONTROL 722 |

*FIG. 7*

LOW POWER MODE IN A SATELLITE-BASED BROADCAST DATA SERVICE

CROSS-REFERENCE TO RELATED APPLICATION

This application is a Divisional of U.S. patent application Ser. No. 14/726,416, filed on May 29, 2015, and entitled LOW POWER MODE IN A SATELLITE-BASED BROADCAST DATA SERVICE; which enhances the system described in U.S. utility application Ser. No. 13/657,295, entitled "SYSTEM AND METHOD FOR PROVIDING ENHANCED THROUGHPUT IN A SATELLITE-BASED BROADCAST DATA SERVICE" sharing the same Assignee as the present invention, the entireties of both of which are explicitly incorporated herein by reference.

BACKGROUND OF THE INVENTION

1. Technical Field of the Invention

This invention pertains in general to satellite-based broadcast data service. The invention pertains in particular to implementing very low power modes through synchronized sleep cycles for terminal devices that receive a satellite broadcast data service.

2. Background of the Invention

The satellite-based data broadcasting capability described in U.S. utility application Ser. No. 13/657,295, and enhanced by the invention therein, provides low-latency delivery of data that can be received by an unlimited number of users. To achieve the low-latency property, that system requires each receiver to be powered on and listening at every transmission opportunity for transmissions that may be addressed to it. This is quite different from the high-latency operation of the satellite paging service described in U.S. Pat. Nos. 5,603,079 and 5,613,194, which trades latency for the ability of receiver devices to spend a large amount of their time powered off and therefore conserving battery power. While the singly-addressed paging service has seen no subscriber growth, which is why its capacity is being repurposed to the group-addressed broadcast service, the low-power aspect of paging has significant appeal for certain broadcast users.

Of course, for any individual application the broadcast originator and its users can a priori agree upon a particular sleep cycle, such that the originator sends requests only within a window around the agreed times occurring at the agreed interval, and a user application powers on the receiver device during those same windows. However, the imprecision of this approach is such that receiver power may still be wasted due to jitter in the broadcast system; the originator lacks precise control over the transmission time of a particular broadcast data block, or burst, so some amount of slack is required to ensure successful delivery. To achieve the most precise control over delivery time, such that the receiver awakens to listen for the broadcasts in which it is interested at the precise time at which those broadcasts may be transmitted, cooperation is needed among the broadcast originator that requests a delivery, a controller that acts on these requests and schedules their actual transmission over the satellite resources, and receiver devices that must be ready for reception at the appropriate time.

Further, though the application-driven low-power mode may be sufficient for many uses, in the most general case a receiver device may be associated with multiple broadcast originators, each with its own transmission interval and corresponding receiver sleep cycle. Ideally these cycles would be mutually optimized, which again leads to methods of cooperation in which the transmission controller is involved.

SUMMARY OF THE INVENTION

In accordance with the principles of the present invention, a satellite system controller for a satellite system can comprise a receiving module, an interval selector, an epoch selector, and a scheduler. The receiving module can receive, from a transmission originator device, a set interval request message requesting the satellite system controller set a transmission interval and an epoch time for a satellite receiver, the transmission interval being an amount of time the satellite receiver is to remain in a sleep mode between expected transmissions and the epoch time being an instant at which the satellite receiver is to expect a satellite transmission. The interval selector can determine, based on the transmission interval, a sleep mode cycle for the satellite receiver. The epoch selector can select the epoch time according to the sleep mode cycle and the scheduler can schedule the satellite transmission with the satellite system at approximately the epoch time and according to the sleep mode cycle.

In further accordance with the principles of the present invention, a satellite system communication method can comprise receiving, at a transmission controller from a transmission originator device, a set interval request message requesting the transmission controller set a transmission interval and an epoch time for a satellite receiver, the transmission interval being an amount of time the satellite receiver is to remain in a sleep mode between expected transmissions and the epoch time being an instant at which the satellite receiver is to expect a satellite transmission, determining, based on the transmission interval, a sleep mode cycle for the satellite receiver, selecting the epoch time according to the sleep mode cycle; and scheduling, at the transmission controller, a satellite transmission of the satellite system at approximately the epoch time and according to the sleep mode cycle.

In further accordance with the principles of the present invention, a satellite receiver can comprise a satellite receiver controller. The satellite receiver controller can retrieve a transmission interval and an epoch time from a wakeup list, select a next wakeup time, enter a sleep mode according to said transmission interval, exit said sleep mode according to said transmission interval, and receive a satellite transmission according to said epoch time. The transmission interval is an amount of time the satellite receiver is to remain in the sleep mode between expected transmissions and the epoch time is an instant at which the satellite receiver is to expect the satellite transmission.

In further accordance with the principles of the present invention, a satellite receiver communication method can comprise retrieving, with a satellite receiver controller of the satellite receiver, a transmission interval and an epoch time from a wakeup list, the transmission interval being an amount of time the satellite receiver is to remain in a sleep mode between expected transmissions and the epoch time being an instant at which the satellite receiver is to expect the satellite transmission; entering the sleep mode according to the transmission interval; exiting the sleep mode according to the transmission interval; and receiving a satellite transmission according to the epoch time.

BRIEF DESCRIPTION OF THE DRAWINGS

Features and advantages of the present invention will become apparent to those skilled in the art from the following description with reference to the drawings. The invention will be better understood from a reading of the following detailed description in conjunction with the drawing figures, in which like reference designators are used to identify like elements and in which:

FIG. 1 illustrates a multi-beam coverage pattern projected on the surface of the earth by a satellite, each beam having a nominal coverage area according to the nominal received power level in nominal channel conditions, in accordance with the principles of the present invention;

FIG. 2 illustrates several adjacent multi-beam coverage patterns projected on the surface of the earth by a number of satellites, each beam having a nominal coverage area according to the nominal received power level in nominal channel conditions, in accordance with the principles of the present invention;

FIG. 6C illustrates exemplary messages exchanged between the broadcast data originator and the broadcast controller during the interaction shown in FIG. 6A, according to the principles of the present invention;

FIG. 7 illustrates an exemplary structure of a broadcast burst as the broadcast burst is transmitted from a satellite to broadcast receiver devices, according to the principles of the present invention.

DETAILED DESCRIPTION OF THE PREFERRED EMBODIMENTS

Figure 3:
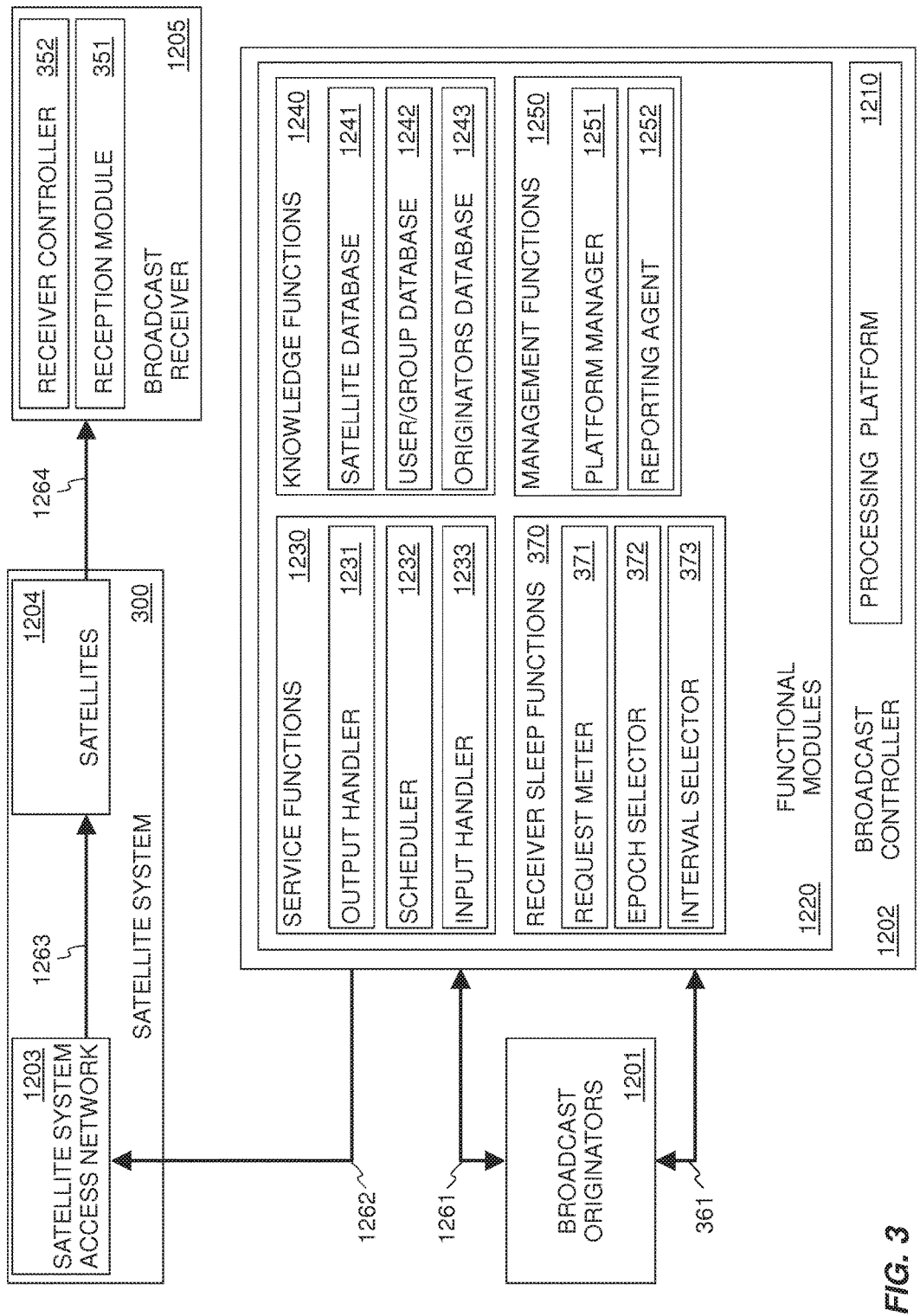
FIG. 3 illustrates an exemplary block diagram of a broadcast system, and in particular a broadcast controller, embodying the principles of the present invention.

What is needed are novel mechanisms for allowing broadcast originators and their users, the broadcast receivers, to negotiate with the satellite broadcast system and establish an optimal balance between latency and receiver power consumption for each group, both independently of any other group, as well as conjointly among multiple groups for those devices that span more than one and may receive broadcasts from all of the corresponding broadcast originators.

It is thus a principal aim of the present invention to provide broadcasting with global or regional scope, for groups of broadcast receivers located anywhere in the world whether in close proximity to one another or widely distributed, and offering multiple data services sourced by multiple data providers. The broadcast originators and broadcast receivers may cooperate with the satellites and a novel controller both to optimize a balance between latency and device power consumption for each group, and to achieve maximum power savings possible for each broadcast receiver in the context of the broadcast receiver's subscribed service set.

Accordingly, the present invention provides a set of methods and a system of cooperating network elements that execute exemplary methods and other functions to accomplish the goal of providing broadcast service to receivers that can spend a significant portion of their lifetimes in a low-power, or sleeping, state.

In the most general case, any multibeam satellite system with broadcast capability can be used as a basis upon which to apply the methods and apparatus of the present invention. The preferred embodiment described herein builds upon the Iridium Global Data Broadcast (GDB) system described in U.S. utility application Ser. No. 13/657,295, which in turn builds its preferred embodiment upon Paging channels of the Iridium system as they have been described in U.S. Pat. Nos. 5,603,079 and 5,613,194.

The above and other advantages of the present embodiments are carried out in one form by an exemplary system of cooperating elements, each of the cooperating elements performing a specific role according to an exemplary method of the invention, as described herein.

FIG. 1 is identical to FIG. 1 of application Ser. No. 13/657,295, and its detailed description can be found in that reference. In summary, FIG. 1 illustrates a multi-beam Coverage Pattern 152 that can comprise a regular arrangement of 48 beams numbered 101 through 148, projected on the surface of the earth by Antenna Projections 151, which are implemented as selective gain areas of an antenna on Satellite 150. As noted in the reference, the beams 101-148 can be represented as regular hexagons, but actual beams may vary in both shape and size. As well, it will be understood by those skilled in the art that any number, arrangement, or size of beams will serve the interests of the present invention.

FIG. 2 is identical to FIG. 2 of application Ser. No. 13/657,295, and its detailed description can be found in that reference. In summary, FIG. 2 illustrates several adjacent multi-beam Coverage Patterns 152, 252, 262, and 272, projected on the surface of the earth by Antenna Projections 151, 251, 261, and 271, respectively, which are implemented as selective gain areas of corresponding antennas on Satellites 150, 250, 260, and 270, respectively, thereby illustrating the extension of multi-beam coverage across large areas through the use of multiple satellites. In a preferred embodiment based on the Iridium Mobile Satellite Services system, enough satellites are present to cover the entire Earth.

FIG. 3 illustrates an exemplary block diagram of a system comprising a number of interacting exemplary physical apparatus elements that can be used to implement the exemplary methods and interactions shown in subsequent figures, to implement the desired advantages disclosed herein. FIG. 3 is based on FIG. 12 of application Ser. No. 13/657,295, including all of the same elements as shown in FIG. 12 of application Ser. No. 13/657,295 and adding enhancements according to the principles of the present invention. Elements of FIG. 12 from the referenced application that appear in FIG. 3 disclosed herein retain their numerical designators for continuity and clarity.

Broadcast Originators 1201 are entities that can act as a source of broadcast data; as in the referenced application, details of how the Broadcast Originators 1201 work or may be implemented are known to those skilled in the art and are beyond the scope of the present invention. Broadcast Originators 1201 can send delivery requests via a physical interface, Interface 1261, to Broadcast Controller 1202. Interface 1261 may be implemented using any commonly available communications medium and protocol. In one embodiment, Interface 1261 may use an email-like protocol. In another embodiment, Interface 1261 may use a web-based protocol. In yet another embodiment, Interface 1261 may use an application protocol built atop the Extensible Messaging and Presence Protocol (XMPP) defined in RFC 6120 published by the Internet Engineering Task Force (IETF). In any case, the semantics of the interaction that occurs via Interface 1261 are described below in the context of FIG. 6A, with additional information provided in the context of FIG. 6B and FIG. 6C.

New in the present invention is a physical interface, Interface 361, between Broadcast Originators 1201 and Broadcast Controller 1202. Preferably implemented using the same communications medium and protocol as Interface 1261 for simplicity, Interface 361 may be used to establish the sleep cycle for a particular broadcast group, using an interaction described below in the context of FIG. 4A, with additional detail provided in the context of FIG. 4B, FIG. 4C, and FIG. 5.

Broadcast Controller 1202 can participate in the interactions as described herein, resulting in transmission requests being communicated via Interface 1262 to the Satellite System Access Network 1203 and thence via Interface 1263 to Satellites 1204. New in the present invention is the grouping of the Satellite System Access Network 1203, the Interface 1263, and the Satellites 1204 into Satellite System 300, a representational convenience that simplifies FIG. 6A. Transmission as radio frequency bursts in selected beams at selected times can occur substantially as described in the referenced application, via Interface 1264 to one or more Broadcast Receivers 1205, modified as described hereinafter according to the principles of the present invention.

Each Broadcast Receiver 1205 can include a Reception Module 351 and a Broadcast Receiver Controller 352. The Reception Module 351 can provide the physical interface for the Broadcast Receiver 1205 to receive satellite broadcasts over Interface 1264. In accordance with the invention disclosed herein, the Reception Module 351 can receive one or more satellite broadcast transmissions including the transmission interval and epoch time disclosed herein. The Broadcast Receiver Controller 352 can implement the inventive steps for establishing a sleep cycle in accordance with the context of FIG. 8.

Broadcast Controller 1202 is inherited from the referenced application and enhanced in accordance with the disclosure of the present invention. The Broadcast Controller 1202 can consist of components that implement the logical functions and specific behavior that form the broadcast system disclosed herein. Processing Platform 1210 can consist of commonly available and well known computing technologies, sized to accommodate the processing, information, and communication load anticipated for a particular deployment. The Processing Platform 1210 can be configured to operate the Functional Modules 1220 that specifically encode the logical functions and detailed behavior of Broadcast Controller 1202. More information on each set of functions is provided in the following paragraphs.

The Management Functions 1250 can allow a system operator or service provider to operate, administer, and maintain the Broadcast Controller 1202. The Management Functions 1250 can be common functions that are well known to those skilled in the art, and which are commonly provided in such types of controllers. Platform Manager 1251 can handle configuration of hardware and software, detection of and recovery from faults that may occur, recordation of events and statistics, and securing of access to the Broadcast Controller 1202 for only authorized personnel. Reporting Agent 1252 can handle forwarding of reports, such as faults, significant events, and statistics, to other systems that may be used by an operator to monitor network elements. The present invention makes no changes to Management Functions 1250 as inherited from the referenced application.

Knowledge Functions 1240 can embody the information and data needed by the Broadcast Controller 1202 to perform Broadcast Controller 1202 functionality, and in particular to execute the various processes of both the referenced application and the present invention. Satellite Database 1241 can incorporate the status and resources of all satellites that may be used to deliver broadcast messages, and is unchanged from the referenced application. User/Group Database 1242 can embody the information about services available to each user or group, and is enhanced in the present invention to include information about the sleep cycle for each broadcast group. Specific data items describing the sleep cycle for a particular group can include the broadcast interval, which is the amount of time a Broadcast Receiver 1205 may sleep between expected transmissions for the group, and its epoch time, which defines an instant at which Broadcast Receivers 1205 in the group may expect broadcasts to be transmitted. Other data described in the referenced application remains. Originators Database 1243 may contain information about Broadcast Originators 1201 as described in the referenced application, and remains unchanged by the present invention.

Service Functions 1230 can continue to embody the processes and methods of the referenced application, which remain applicable in and are enhanced by the present invention. Output Handler 1231 is essentially unchanged, its primary behavioral determinant still being driven by how the Output Handler 1231 interacts with Satellite System 300 to request broadcast transmissions. Scheduler 1232 and Input Handler 1233, while still performing the functions described in the referenced application, are enhanced in the present invention to accommodate the sleep cycle timing for each broadcast group, through the addition of internal interactions with the new modules in Receiver Sleep Functions 370; these new internal interactions are described in the context of FIG. 6A and FIG. 6B.

Receiver Sleep Functions 370 can encapsulate modules that are new to Broadcast Controller 1202 in the present invention. Interval Selector 373 can be responsible for interacting with Broadcast Originators 1201 via Interface 361, supporting the process of establishing a sleep cycle for a particular broadcast group; this process is depicted in detail in FIG. 4A and described below in that context. Epoch Selector 372 can work with Interval Selector 373 to establish a transmission epoch for a particular broadcast group, executing the methods depicted in FIG. 4C and FIG. 5. Finally, Request Meter 371 interacts with Input Handler 1233 and Scheduler 1232 to ensure that the broadcasts of a group with a sleep cycle are transmitted at the proper interval and on the proper epoch, executing the method depicted in FIG. 6B in the context of the event sequence depicted in FIG. 6A.

In addition to the internal interactions described above, various internal interactions (not described) that will be derivable by those skilled in the art are also implemented among the components of Functional Modules 1220, as well as between the Functional Modules 1220 and the components of Processing Platform 1210. The details of such internal interactions may be implemented in numerous ways not pertinent to the novel aspects of the present invention.

Figure 4:
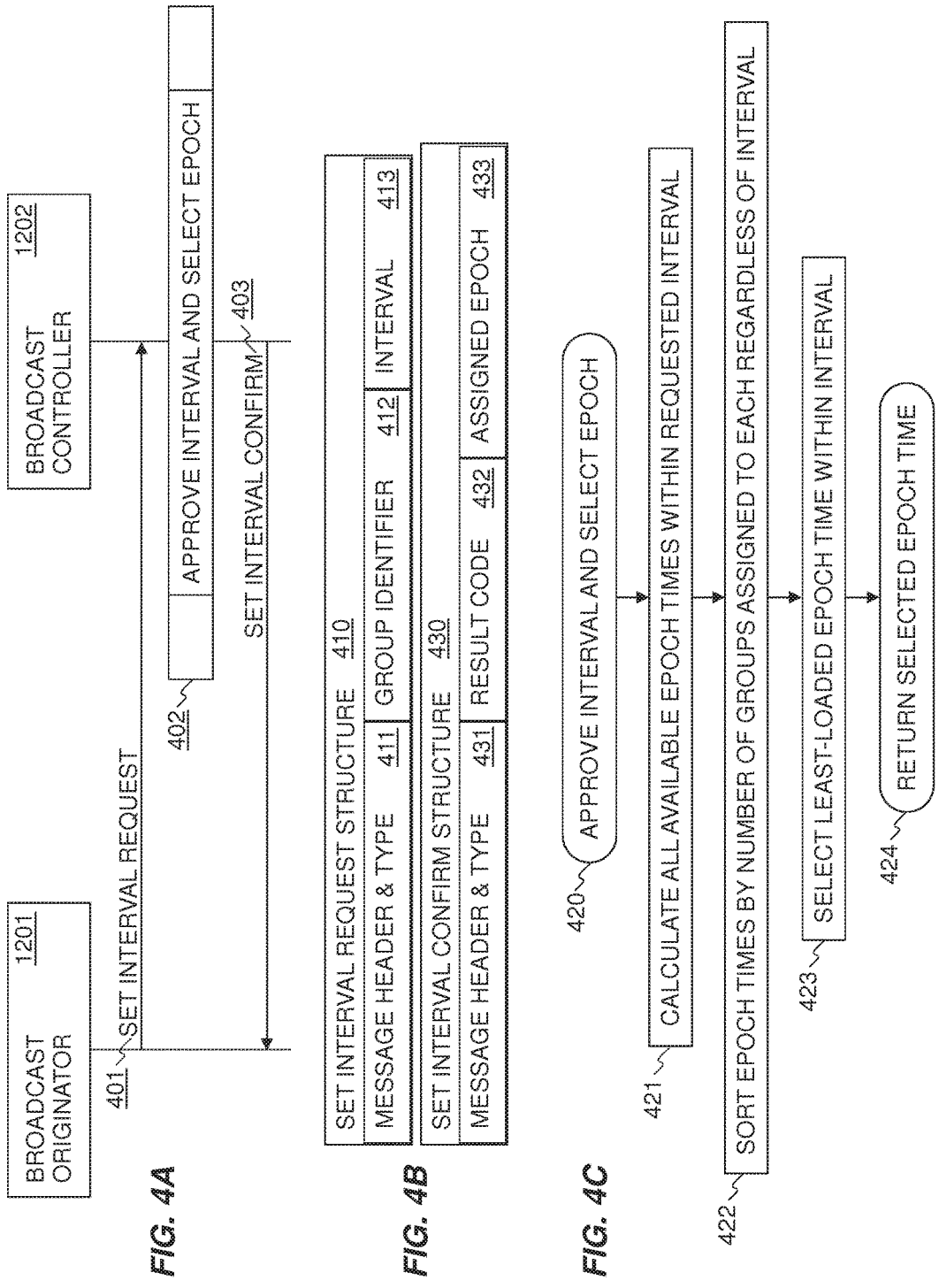
FIG. 4A is an exemplary message sequence chart illustrating an interaction between a broadcast data originator and the broadcast controller of the broadcast system, whereby the broadcast data originator and the broadcast controller can agree upon a sleep interval for a particular broadcast receiver group, according to the principles of the present invention.
FIG. 4B illustrates the messages exchanged during the interaction of the broadcast data originator and the broadcast controller shown in FIG. 4A, according to the principles of the present invention.
FIG. 4C illustrates an exemplary method by which the broadcast system controller may determine which epoch time to assign a group within its requested interval, according to the principles of the present invention.

FIG. 4A depicts an exemplary message sequence chart representing interaction between the Broadcast Originator 1201 and the Broadcast Controller 1202 for a purpose of establishing a low power sleep cycle for a particular broadcast group for which Broadcast Originator 1201 sends data. The sequence can begin at step 401 with a Set Interval Request message, which Broadcast Originator 1201 can send to Broadcast Controller 1202.

A notional view of the information that can be included in a Set Interval Request message is shown in the upper portion of FIG. 4B as Set Interval Request Structure 410. A Message Header and Type field 411 of the Set Interval Request Structure 410 can contain message discriminators and other control protocol information that may be necessary in the context of a specific embodiment for Interface 361; this field is not further described here as its contents are not novel to the present invention and will be readily derivable by those skilled in the art. The Group Identifier field 412 of Set Interval Request Structure 410 can contain a code that uniquely identifies the broadcast group for which Broadcast Originator 1201 wishes to establish a low power sleep cycle. Group Identifier 412 may take any form usable as a key to User/Group Database 1242; in a preferred embodiment the format is flexible to accommodate either a character string representing a mnemonic name assigned by the group's Broadcast Originator 1201, or a numerical index assigned by Broadcast Controller 1202, both agreed and linked to one another in User/Group Database 1242 during provisioning of the broadcast group. The Interval field 413 of Set Interval Request Structure 410 can contain the duration of the low power sleep cycle desired by Broadcast Originator 1201 for the broadcast group named in Group Identifier field 412. The format of Interval 413 can provide an optimal fit between the native time scale of Satellite System 300, the range of interval values desired by Broadcast Originators 1201 to match the native time scale of their application data, and the range of interval values desired by users of Broadcast Receivers 1205 to match battery life requirements of the Broadcast Receivers 1205; clearly multiple solutions are possible within the scope of the present invention. In a preferred embodiment using the Iridium MSS system as Satellite System 300, which has a native time scale of 90 milliseconds, Interval 413 may be expressed as an integer that is multiplied by 90 to determine the actual low power sleep cycle duration in milliseconds. In a preferred embodiment further constrained by the timing hierarchy described in U.S. Pat. Nos. 5,603,079 and 5,613,194 as cited above, which has a native time scale of 21.6 seconds, Interval 413 may be expressed as an integer that is multiplied by 240 to determine the actual low power sleep cycle in milliseconds.

In a preferred embodiment that offers a variety of intervals for selection by Broadcast Originators 1201, the representation for Interval 413 may consist of two subfields, the first to express a base unit of time such as minutes, hours, or days, and the second to express how many of those time units the duration should last. In one embodiment combining all these attributes, Interval 413 may include two subfields. The first subfield might consist of a single bit, with the zero value representing a unit of 21.6 seconds (240 Iridium frame times or 1 Iridium paging block time per U.S. Pat. No. 5,603,079) and the one value representing a unit of 3,607.2 seconds or about one hour (40,080 Iridium time frames or 167 Iridium paging blocks). The second subfield might then consist of a 3-bit integer representing an exponent applied to yield a power of 2 which is then multiplied by the base unit (21.6 or 3607.2 seconds). Interpreted together, these fields would allow low power sleep cycle durations in a preferred embodiment to be selected from the following settings: approximately 22, 43, and 86 seconds, approximately 3, 6, 12, 23, and 46 minutes, and approximately 1, 2, 4, 8, 16, 32, 64, and 128 hours. In alternate embodiments, Interval 413 may be expressed as a percentage of time that Broadcast Receivers 1205 should be powered off, or as a ratio of the time that should be spent powered on to the time that should be spent powered off, either of which Broadcast Controller 1202 may then translate into an actual sleep cycle interval.

Figure 5:
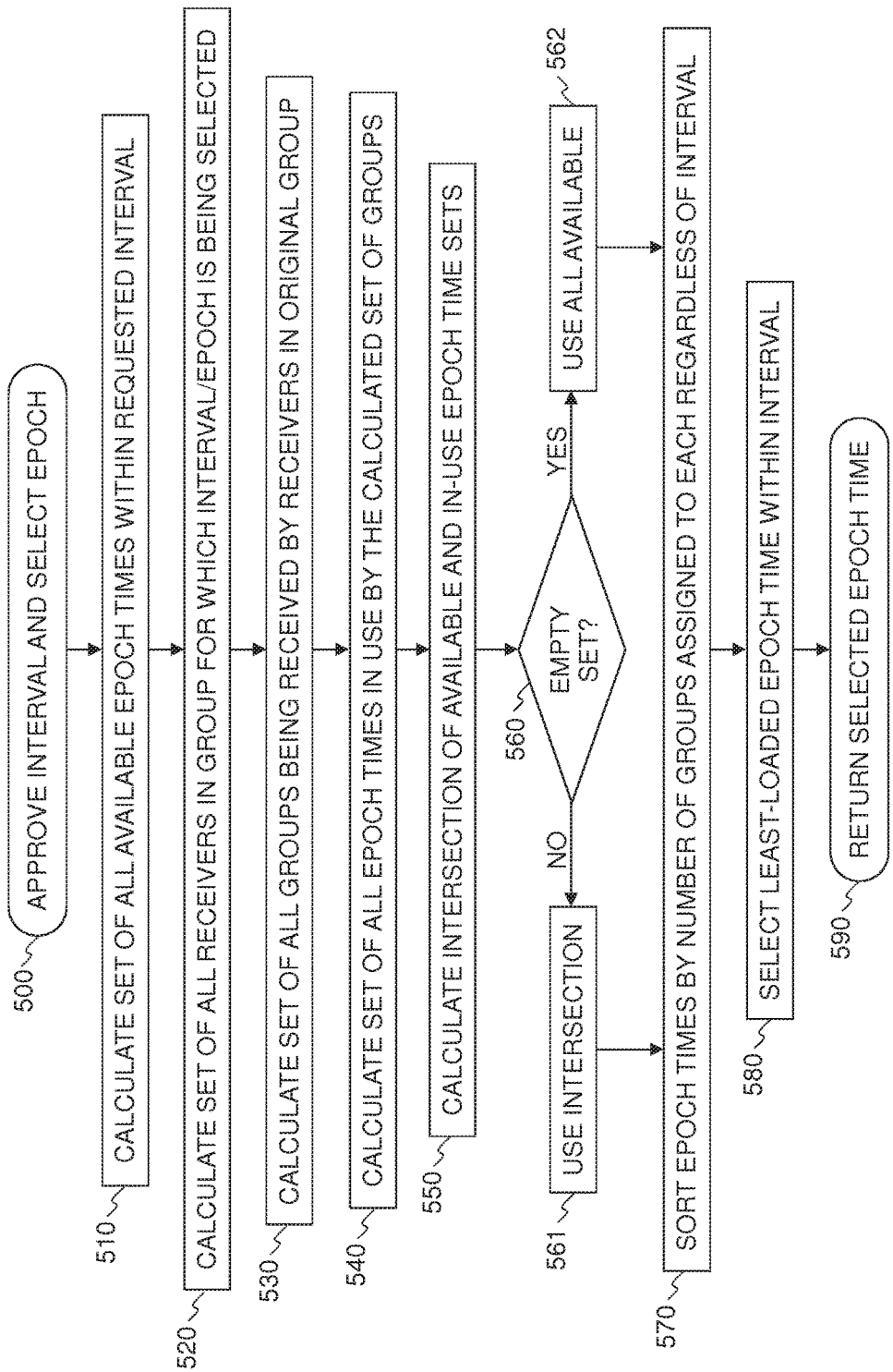
FIG. 5 illustrates another exemplary method by which the broadcast system controller may determine which epoch time to assign a group within its requested interval, according to the principles of the present invention.

Returning to FIG. 4A, upon receipt of the Set Interval Request message 401, Broadcast Controller 1202 may execute a procedure, represented in the figure as Step 402 Approve Interval and Select Epoch, to interpret the requested Interval 413 and determine an appropriate epoch time at which to start the low power sleep cycle for the requested Group Identifier 412. FIG. 4C and FIG. 5 illustrate two different methods that may be used in Step 402 to select the epoch time; their descriptions will follow the remainder of the FIG. 4A and FIG. 4B descriptions. Other methods may be devised as well within the scope of Step 402 disclosed herein. After the epoch time has been selected in Step 402, Broadcast Controller 1202 can format a Set Interval Confirm message and at Step 403 sends it to Broadcast Originator 1201; this Set Interval Confirm message can both confirm that the requested Interval 412 has been accepted and recorded in Database 1242, and inform Broadcast Originator 1201 of the selected epoch time.

A notional view of the information that can be included in a Set Interval Confirm message is shown in the lower portion of FIG. 4B as Set Interval Confirm Structure 430. The Set Interval Confirm message's Message Header and Type field 431 is similar to field 411 of the Request Structure 410, except that the Message Header and Type field 431 can identify the Set Interval Confirm message instead of the Set Interval Request message. Result Code field 432 can contain a representation of the outcome of request processing in Broadcast Controller 1202. Preferably the Result Code field 432 should indicate success but the Result Code field 432 may also indicate various failure modes, most of which would be specific to the implementation of Step 402 or the detailed architecture of Broadcast Controller 1202. Such one or more indications are a common technique and appropriate values for Result Code field 432 can be readily derivable by those skilled in the art; therefore such indications are not further elaborated herein. Finally, the Assigned Epoch field 433 may contain a representation of the epoch time at which the requested Interval 413 begins. Several formats are possible for this field. Assigned Epoch 433 may be expressed as an absolute time using a standard representation such as that in IETF RFC 3339, ISO 8601, or an appropriate data type from the W3C XML Schema. In a preferred embodiment using the Iridium MSS system as Satellite System 300, Assigned Epoch 433 may be expressed as an integer representing the number of 90 millisecond frame times after any frame number that is an integer multiple of Interval 413. Thus, the sum of Assigned Epoch 433 and the most recent frame number that is an integer multiple of Interval 413 may yield the next expected transmission time for broadcasts addressed to Broadcast Receivers 1205 in the group denoted by Group Identifier 412. The range of Assigned Epoch 433 in this approach is bounded by the longest allowable Interval 413, which in a preferred embodiment described above amounts to 5,130,240 Iridium frame times of 90 milliseconds each, a number that requires 23 bits to represent and can therefore reasonably be used in a message.

Note that the messages represented by Set Interval Request Structure 410 and Set Interval Confirm Structure 430 in FIG. 4B may contain additional fields not described herein, but addition of such fields is within the scope of the present invention. Note also that what Broadcast Originator 1201 may choose to do with the information it receives in the Set Interval Confirm message 403 is outside the scope of the present invention, and therefore is not further described herein.

FIG. 4C illustrates an exemplary method for determining a suitable epoch time for a requested low power sleep cycle duration. The Epoch Selector, functional module 372 of Broadcast Controller 1202, may execute the method shown in FIG. 4C during Step 402 Approve Interval and Select Epoch of FIG. 4A, as Subroutine 420, also named Approve Interval and Select Epoch. Beginning at Step 421, Subroutine 420 can first calculate all available epoch times within the requested Interval 413. This calculation is based on identification of a number of possible transmission times during the requested Interval 413, which is highly dependent on the native time scale of the particular Satellite System 300 to which the present invention is being applied. In a preferred embodiment using the Iridium MSS system, every 90 millisecond frame time in the selected interval may be included in this list of possible transmission times. Next, at Step 422 as shown in FIG. 4C, Subroutine 420 may extract from Database 1242 all the broadcast groups associated with each possible transmission time in the requested Interval 413 by treating each as a possible epoch time, taking care to recognize that each time occurs in multiple intervals modulo the interval length; assign a count of groups to each candidate epoch time; and sort the list of candidate epoch times according to a number of groups utilizing each candidate epoch time, again taking care to recognize cases in which a group may be counted against multiple candidate epoch times in the requested Interval 413 at hand due to the appearance of that group's epoch time at each of its repeats modulo its own shorter interval. In other words, the repeat factor for each group considered in turn may cause that group to appear at multiple candidate epoch times within the requested Interval 413, and each of those appearances should be counted. Finally, in Step 423 the candidate epoch time with the fewest groups using the candidate epoch time can be selected, and in Step 424 this candidate epoch time is returned as a result for use in the remainder of the FIG. 4A sequence; if more than one candidate epoch time has equally minimal loading, any of the candidate epoch times may be chosen.

One skilled in the art will recognize that Subroutine 420 can consider only the overall load on the broadcast system in selecting a broadcast epoch time. Subroutine 420 explicitly does not attempt to maximize device sleep time by bunching into a common epoch time the multiple groups to which an individual Broadcast Receiver 1205 might be subscribed. A method of selecting epoch time which does consider this factor is provided in FIG. 5 as Subroutine 500, also named Approve Interval and Select Epoch for compatibility with FIG. 4A Step 402, and described in the following paragraph. Which method of selecting an epoch time is chosen for a particular instance of Broadcast Controller 1202, whether the epoch time selection described in Step 420 or Step 500, or any other not explicitly described in the present invention, is a matter for system engineering and configuration at the time of its implementation in the context of a particular Satellite System 300.

Referring now to FIG. 5, Subroutine 500 can begin as Subroutine 420 does, by calculating in Step 510 all the candidate epoch times within the requested Interval 413; Step 510 can be identical to Step 421 in FIG. 4C. After Step 510, the method of Subroutine 500 can diverge significantly as Subroutine 500 attempts to select an existing wakeup epoch if possible.

Step 520 can begin an optimization process by looking into Database 1242 to find a set of all Broadcast Receivers 1205 in a broadcast group named in Group Identifier 412. In Step 530, the method may expand upon the list of Broadcast Receivers 1205 to find, also in Database 1242, the set of all broadcast groups being monitored by any of the Broadcast Receivers 1205 in the set from Step 520. Step 540 can look even further into Database 1242 to find a set of all epoch times in use by the broadcast groups in the set from Step 530. Finally, Step 550 can calculate the intersection of the available epoch times from Step 510 and the in-use epoch times from Step 540. Step 560 can then test whether the resulting set of candidate epoch times is empty or not. If the resulting set of candidate epoch times from Step 550 is not empty, such a result will be deemed optimal in terms of minimizing receiver wakeup times to use an epoch time from this set, because the Broadcast Receivers 1205 are already waking at these times. Therefore, in this case Subroutine 500 may follow the No branch from Step 560 to Step 561, in which the set from Step 550 is used for subsequent operations. If, however, none of the in-use epoch times are usable for the requested broadcast group, because the set from Step 550 is empty, a necessity is produced to pick a new epoch time and add this new epoch time to the wakeup schedule of the affected Broadcast Receivers 1205. In this case, Subroutine 500 can follow the Yes branch from Step 560 to Step 562, in which the set from Step 510, containing all epoch times in the interval, is used for subsequent operations. Whichever set of candidate epoch times has been chosen for use at this point, Step 570 may sort them by the number of groups assigned to each, as is performed in Step 422 of Subroutine 420, including Step 422's attention to repeat factors. Then Step 580 can select the epoch time candidate which has the least loading factor. Note that while this loading factor may be determined as described in Step 423, using the number of groups that also use the same epoch time, other factors may also be considered. For example, a history of actual traffic usage at each epoch time may be used to determine the most lightly loaded epoch time. Finally, as in Step 424, Step 590 can return the selected epoch time as a result for use in the remainder of the FIG. 4A's sequence; again, if more than one candidate epoch time has equally minimal loading, any of such candidate epoch times may be chosen.

One skilled in the art may observe that Subroutine 420 can be considered identical to certain degenerate paths through Subroutine 500, including a case in which the Broadcast Receivers 1205 of the broadcast group at hand subscribe no other groups, and a case in which there is no overlap between the epoch time candidates for the broadcast group at hand and the epoch times already in use by the affected Broadcast Receivers 1205. For this reason, one embodiment may choose to omit implementation of Subroutine 420 altogether, while another embodiment may choose to implement both Subroutine 420 and Subroutine 500 as a single, unified subroutine by incorporating some simple tests, not depicted in FIG. 5, prior to executing the more complex database operations of Steps 520 through 560.

The diagrams in FIG. 4A, FIG. 4B, FIG. 4C, and FIG. 5 have depicted a process to establish a transmission epoch time for a particular broadcast group. The diagrams in FIG. 6A, FIG. 6B, FIG. 6C, and FIG. 7 in turn depict a process to establish a precise transmission time for a particular broadcast, using the epoch time selected previously.

Figure 6A:
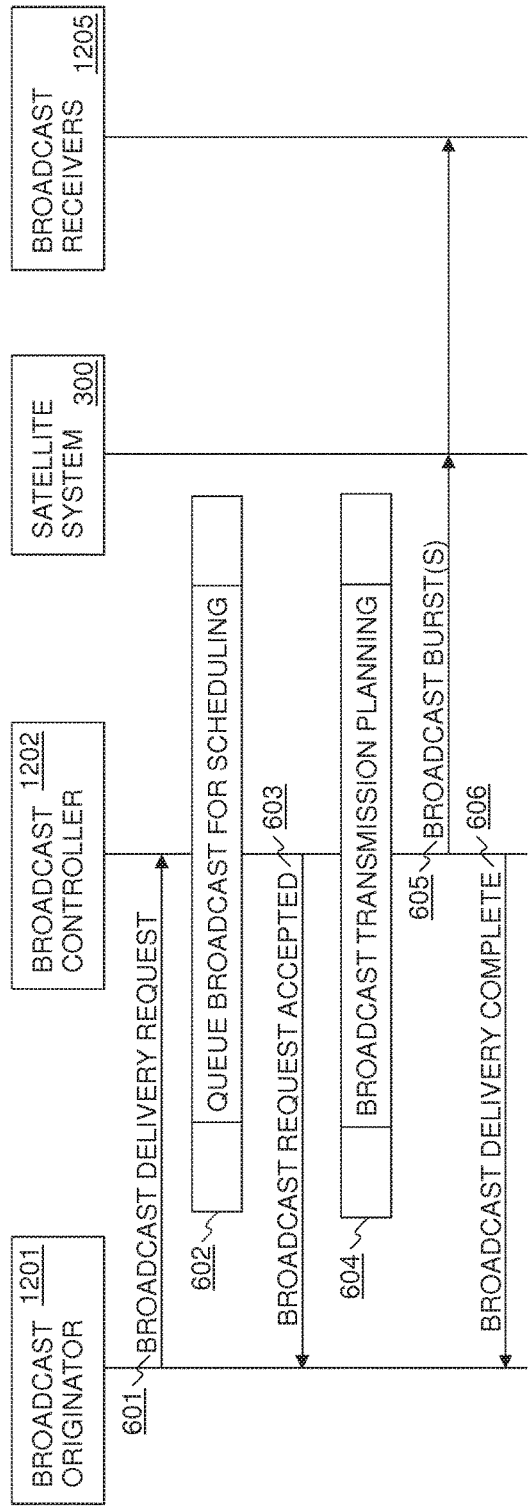
FIG. 6A is an exemplary message sequence chart illustrating an interaction among elements of the broadcast system from FIG. 3, whereby a block of information to be broadcast is requested, processed, and transmitted according to the principles of the present invention.

FIG. 6A depicts an exemplary message sequence chart representing an interaction between a Broadcast Originator 1201 and Broadcast Controller 1202 for the purpose of requesting and executing a broadcast delivery. The sequence can begin at step 601 with a Broadcast Delivery Request message, which Broadcast Originator 1201 sends to Broadcast Controller 1202.

A notional view of the information included in a Broadcast Delivery Request message is shown in the upper portion of FIG. 6C as Broadcast Delivery Request Structure 610. Message Header and Type field 611 can contain message discriminators and other control protocol information that may be necessary in the context of a specific embodiment for Interface 1261; this field is not further described herein as its contents are not novel to the present invention and will be readily derivable by those skilled in the art, other than to note that because Interface 1261 and Interface 361 have been described as sharing a common transport, the Message Header and Type fields 411 and 611 can in one embodiment share a common substructure in order to simplify the detection of their distinct discriminators. The Group Identifier field 612 of Broadcast Delivery Request Structure 610 can contain a code that uniquely identifies the broadcast group for which Broadcast Originator 1201 wishes to deliver data. Group Identifier 612 can be substantially similar to Group Identifier 412, and may take same forms as described for the Group Identifier 412. Delivery Time field 613 can inform Broadcast Controller 1202 when Broadcast Originator 1201 wants the broadcast data to be transmitted. Delivery Time 613 may include a representation of an absolute time or a time offset from the present; in either case the Delivery Time 613 can be formatted using a standard such as IETF RFC 3339, ISO 8601, or a datatype from the W3C XML Schema, or using a custom format configured for ease of mapping to a specific Satellite System 300, according to the specific requirements for a particular implementation embodying the present invention. Delivery Area field 614 can inform Broadcast Controller 1202 where in the world Broadcast Originator 1201 wants the broadcast data to be transmitted. Delivery Area 614 may include multiple location indicators of various types, including region names such as countries, oceans, or continents, region descriptors such as a list of latitude/longitude pairs representing points at the corners of a polygonal area, a single latitude/longitude pair accompanied by the radius of a circle around the point so represented, or other representations configured for ease of mapping to a specific Satellite System 300, according to specific requirements for a particular implementation embodying the present invention. Finally, Broadcast Information Payload field 615 can contain the data to be broadcast as a result of Broadcast Delivery Request message 601.

Figure 6B:
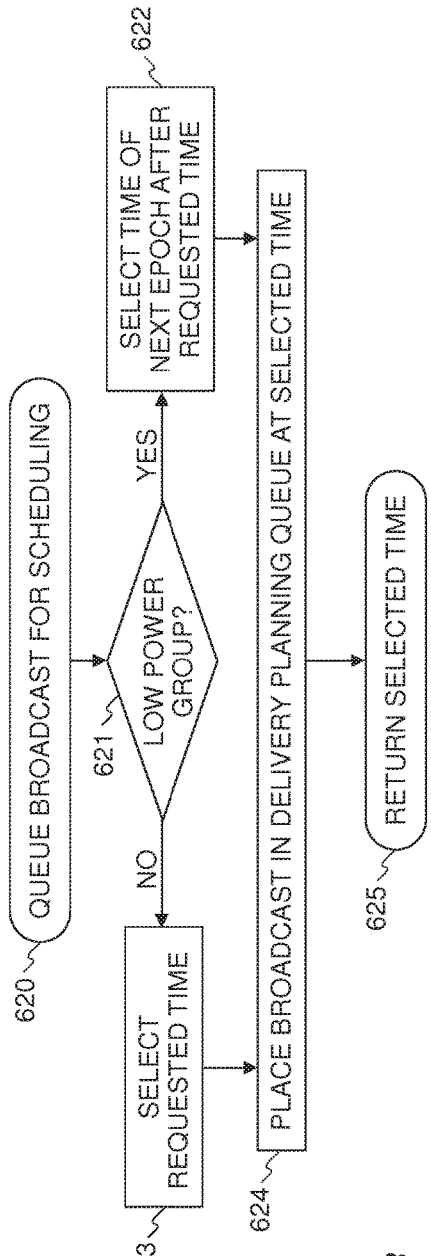
FIG. 6B illustrates an exemplary method by which the broadcast controller may accept and queue a requested broadcast into the transmission planning cycle at the appropriate time, according to the principles of the present invention.

Returning to FIG. 6A, upon receipt of the Broadcast Delivery Request message 601, Broadcast Controller 1202 may execute a procedure, represented as Step 602 Queue Broadcast for Scheduling, to interpret the provided information and place the requested broadcast data into the transmission planning pipeline. FIG. 6B illustrates a method that may be used in Step 602 to interpret the provided information and place the requested broadcast data into the transmission planning pipeline, based on attributes of the broadcast group named by Group Identifier 612. Subroutine 620, named Queue Broadcast for Scheduling for compatibility with Step 602 of FIG. 6A, begins Step 621 by checking Database 1242 to determine whether Group Identifier 612 has an associated low power sleep cycle. If the Group Identifier 612 does have an associated low power sleep cycle, Subroutine 620 follows the Yes branch of Step 621 to Step 622, where Step 622 can select the next epoch time following the requested Delivery Time 613 for use in subsequent operations. Otherwise, Subroutine 620 follows the No branch to Step 623, where Step 623 can select the actual time represented by Delivery Time 613 for use in subsequent operations. Having selected a nominal transmission time, Subroutine 620 can proceed in Step 624 to create an entry in the transmission planning queue at the selected time, linking such an entry to the data in Broadcast Delivery Request message 601, and return a selected nominal transmission time as the result from Step 625 for use in the remainder of the sequence illustrated in FIG. 6A.

Upon completion of the queuing operation of Step 602 using Subroutine 620, Broadcast Controller 1202 can format a Broadcast Request Accepted message and at Step 603 sends the Broadcast Request Accepted message to Broadcast Originator 1201; the Broadcast Request Accepted message can both confirm that the requested Broadcast Information Payload 615 has been accepted and queued for transmission planning, and inform Broadcast Originator 1201 of the selected nominal transmission time in case the selected nominal transmission time is different from the requested Delivery Time 613. A notional view of the information included in a Broadcast Request Accepted message 603 is shown in the middle portion of FIG. 6C as Broadcast Request Accepted Structure 630. Message Header and Type field 631 of Broadcast Request Accepted Structure 630 can be similar to field 611 of the Request Structure 610, except that the Message Header and Type field 631 can identify the Broadcast Request Accepted message 603 instead of the Broadcast Delivery Request message 601. Result Code field 632 can contain a representation of the outcome of request processing in Broadcast Controller 1202. Preferably such a representation will indicate success but such a representation may also indicate various failure modes, most of which would be specific to the implementation of Step 602 or the detailed architecture of Broadcast Controller 1202. Providing such indications is a common technique and appropriate values for Result Code 632 are readily derivable by those skilled in the art, so such indications are not further elaborated here. Finally, as noted above the Broadcast Request Accepted message 603 provides an Estimated Transmission Time field 633 to Broadcast Originator 1201; the format of the Estimated Transmission Time field 633 will preferably match the format of other time fields in a particular implementation embodying the present invention, as previously described. Upon receiving the Broadcast Request Accepted message 603 at Step 603, the behavior of Broadcast Originator 1201 is neither specified in nor pertinent to the present invention, but can record success or failure of the request and, if Result Code 632 indicates a failure, decide whether or not to re-attempt a transmission with the same broadcast data.

Continuing down the flow of FIG. 6A, at Step 604 the Broadcast Transmission Planning process can arrive at an appropriate time to schedule the broadcast queued in step 602. Broadcast Transmission Planning is a process that can be configured to run endlessly as part of Scheduler module 1232 of Broadcast Controller 1202, scheduling broadcast transmissions to occur at each increment of time. Time increments and how far in advance of a requested transmission time the Broadcast Transmission Planning process operates are defined by capabilities of a particular Satellite System 300 to which the present invention is being applied. Any of multiple planning algorithms may be used in a particular implementation embodying the present invention. In a preferred embodiment, the Broadcast Transmission Planning Method 1100 from FIG. 11 of application Ser. No. 13/657,295 can be used.

When it is time for the broadcast data queued in Step 602 and scheduled by the Broadcast Transmission Planning process encapsulated in Step 604 to be transmitted, some number of Broadcast Bursts can emerge from Step 604. Output Handler module 1231 of Broadcast Controller 1202 can then in Step 605 format each Broadcast Burst and send the Broadcast Burst to Satellite System 300 for transmission via the appropriate Satellite 1204. FIG. 6A depicts only one Broadcast Burst in the message sequence, flowing from Broadcast Controller 1202 to Satellite System 300 and on from there to Broadcast Receivers 1205, but the actual number of Broadcast Bursts sent in Step 605 can depend on such factors as native timing and burst capacity of Satellites 1204. Such factors may all be considered in the Broadcast Transmission Planning process used in a particular implementation embodying the present invention, and used to establish a number of bursts and their destinations. FIG. 7 provides an exemplary notional view of the information that may be included in a Broadcast Burst; such information's description follows after the descriptions of FIG. 6A and FIG. 6C. Note that, as a broadcast system there is generally no response possible or expected from Broadcast Receivers 1205, and therefore no guarantee that all Broadcast Receivers 1205 have actually received every Broadcast Burst sent in Step 605. A particular implementation embodying the present invention will generally be designed to utilize the capabilities of Satellite System 300 in such a way that the probability of successful delivery is high enough to meet the goals of the service provided by the Satellite System 300.

After all Broadcast Bursts associated with the original Broadcast Delivery Request message 601 have been transmitted in Step 605, Broadcast Controller 1202 can conclude the sequence by formatting a Broadcast Delivery Complete message 606 and at Step 606 sending the Broadcast Delivery Complete message 606 to Broadcast Originator 1201, thereby confirming that the original Broadcast Information Payload 615 requested at Step 601 has been transmitted. An exemplary notional view of information that can be included in a Broadcast Delivery Complete 606 message is shown in the bottom portion of FIG. 6C as Broadcast Delivery Complete Structure 660. Message Header and Type field 661 of Broadcast Delivery Complete Structure 660 can be similar to field 631 of the Request Accepted Structure 630, except that the Message Header and Type field 661 identifies the Broadcast Delivery Complete message 606 instead of the Broadcast Request Accepted message 603. Result Code field 662 may contain a representation of an outcome of scheduling and transmission processing in Broadcast Controller 1202. Preferably such a representation can indicate success but it may also indicate various failure modes, most of which would be specific to the implementation of Steps 604 and 605, or the detailed architecture of Broadcast Controller 1202. Such representation is a common technique and appropriate values for Result Code 662 can be readily derivable by those skilled in the art, so they are not further elaborated here. Finally, the Broadcast Delivery Complete Structure 660 provides an Actual Transmission Time field 663 to Broadcast Originator 1201; the format of the Actual Transmission Time field 663 can preferably match the format of other time fields in a particular implementation embodying the present invention, as previously described, and may generally contain as many timestamps as there were Broadcast Bursts, in case those transmissions were spread over a span of time due to capacity constraints in Satellite System 300. Upon receiving the Broadcast Delivery Complete message 606 at Step 606, Broadcast Originator 1201 can record the success or failure of the request and, if Result Code 662 indicates a failure, decide whether or not to re-attempt a transmission with the same broadcast data.

FIG. 7 provides exemplary information that may be included in a Broadcast Burst as sent at Step 605, with the top portion of FIG. 7 showing the overall Broadcast Burst Structure 700. Group Header 701 can carry information needed for a Broadcast Receiver 1205 to determine whether the Broadcast Receiver 1205 should process or ignore the burst, Content Header 702 can carry the information needed for a Broadcast Receiver 1205 to determine meaning of this burst and place the burst in the context of other bursts associated with the same Group Header 701 over time. Content Payload 703 may carry actual broadcast information or portion thereof that is being delivered in a particular burst. Note that the Group Header 701, the Content Header 702, and the Group Header 701 are only those that pertain directly to the present invention. When applied to a particular Satellite System 300 in order to form a complete system embodying the present invention, additional fields may be required for wireless communication in Satellite System 300, though not shown. Examples of such additional fields can include synchronization preambles and postambles, physical and medium access control protocol layer information, and error correction coding. As well, additional fields and subfields not related to the present invention may be included in a particular burst without altering the relevance of the fields shown herein to the present invention.

Further detail of Group Header 701 is shown in the middle portion of FIG. 7 as Group Header Structure 710, comprising multiple subfields. Group Address 711 can identify a broadcast group to which this burst pertains, and therefore the specific set of Broadcast Receivers 1205 that should process this burst upon receiving it. Group Address 711 can be a special form of the previously described Group Identifier 412 and 612, specifically encoded for transmission via Satellite System 300; the exact encoding may be dependent upon the capabilities of Satellite System 300, and so can be chosen when designing a particular instantiation of a broadcast system embodying the present invention. Group Interval 712 and Group Epoch 713 may identify a low power sleep cycle associated with the broadcast group identified by Group Address 711, allowing the Broadcast Receivers 1205 that decode this burst to determine when they should next expect to receive a burst related to this group. The Group Interval 712 and Group Epoch 713 may carry the information previously described as Interval 413 and Assigned Epoch 433 with respect to the messages of FIG. 4A and message structures of FIG. 4B, generally coded in terms pertinent to how time is expressed in the specific Satellite System 300 to which the present invention is being applied to form a complete broadcast system. In one embodiment, the Group Interval 712 and Group Epoch 713 may be coded as described previously for a preferred embodiment of the Interval 413 and Assigned Epoch 433 fields. Depending on the capabilities of Satellite System 300, Group Epoch 713 may be omitted; if Broadcast Receiver 1205 can infer the epoch from the current time at which a particular burst is received, only Group Interval 712 would be necessary. In an alternate embodiment, Group Interval 712 and Group Epoch 713 may be transmitted only in subscription control broadcasts that occur infrequently, rather than in every burst associated with Group Address 711, thereby conserving transmission capacity.

Further detail of Content Header 702 is shown in the bottom portion of FIG. 7 as Content Header Structure 720, and can comprise multiple subfields. Burst Type 721 may identify what kind of information is included in a burst. While the discussion so far has centered on carrying broadcast data from Broadcast Originators 1201, overhead information directly from Broadcast Controller 1202 may also be sent to Broadcast Receivers 1205. Examples of such overhead information can include subscription control information and system status information. Other uses of Burst Type 721 may be to distinguish multiple formats, as well as presence or absence, of the Sequencing and Segmentation Control subfield 722 that follows it in the burst. Sequencing and Segmentation Control subfield 722 can provide Broadcast Receiver 1205 with context information regarding this burst as it relates to other bursts that may have been received previously or may be received subsequently. In a preferred embodiment, a sequence number may be included in order to identify the order in which bursts should be assembled, in case the bursts are received out of order. Out of order bursts can occur in a typical Satellite System 300 due to poor signal conditions at some transmission times and good signal conditions at others, coupled with repeated transmission of the same burst at different times in order to overcome expected loss or error. In one embodiment, segment numbers for the current burst and the expected last segment to come in a future burst may be included in order to support delivery of broadcast information blocks that are larger than the capacity of a single burst, according to the capabilities of Satellite System 300 as applied in a particular implementation embodying the present invention.

Note that additional fields and subfields may be sent with a particular burst in addition to those shown in FIG. 7, without affecting the applicability of the depicted fields to the present invention.

Figure 8:
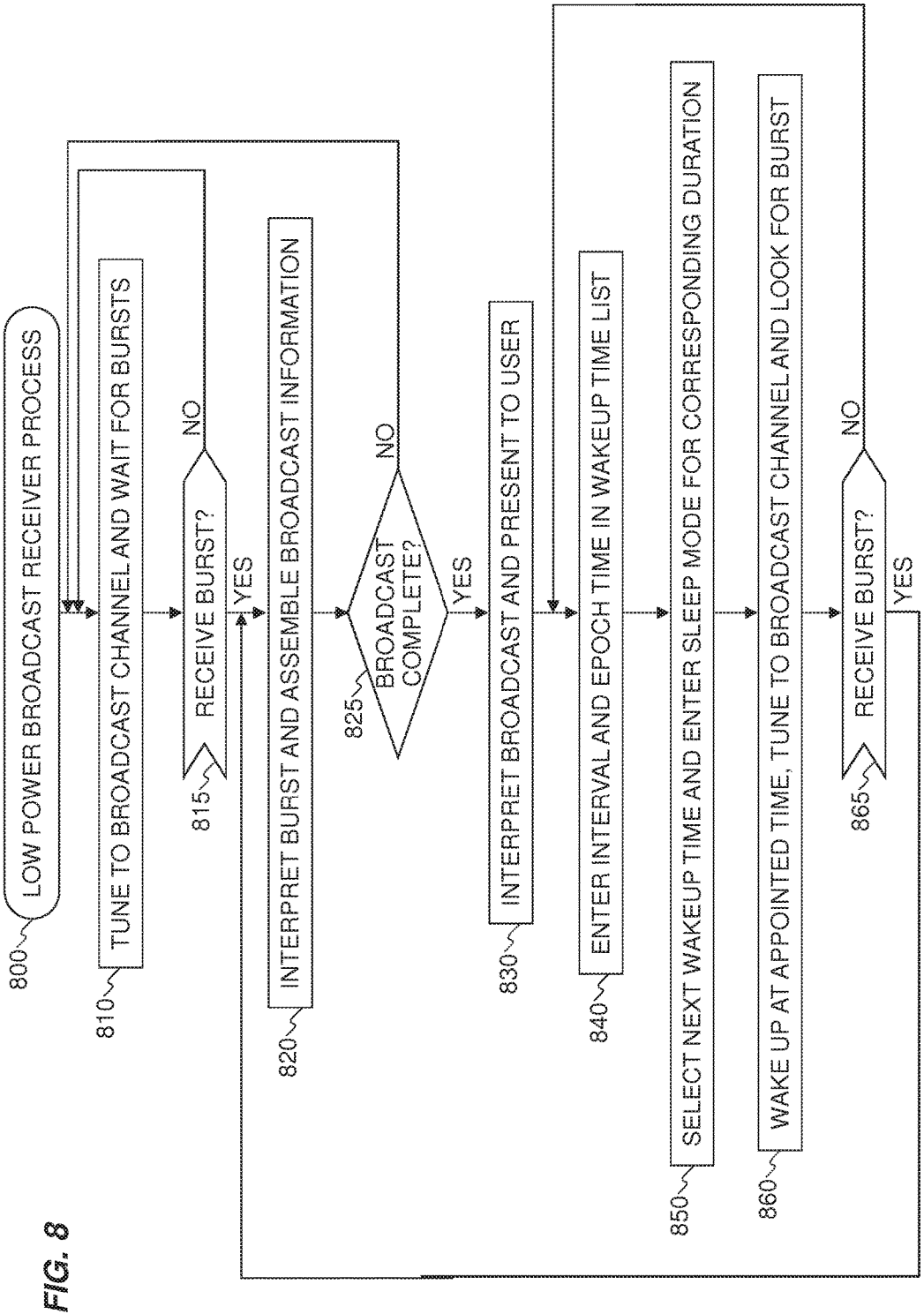
FIG. 8 illustrates an exemplary method by which a broadcast receiver device may discover and act upon the sleep intervals and specific epoch times within those intervals for all the broadcast groups to which it is assigned, according to the principles of the present invention.

In FIG. 8, an exemplary method is provided whereby a Broadcast Receiver 1205 may operate one or more low power sleep cycles associated with one or more broadcast groups to which it is subscribed. The method is shown as a persistent process, which may operate continuously within an implementation of Broadcast Receiver 1205. This Low Power Broadcast Receiver Process 800 can begin when Broadcast Receiver 1205 initializes itself, starting with Step 810 in which Reception Module 351 of the Broadcast Receiver 1205 may tune to a channel on which it expects broadcast bursts to be transmitted, and waits for a burst to occur. How the tuning and monitoring take place is specific to the physical attributes of Interface 1264 between Satellites 1204 and Broadcast Receiver 1205, which is in turn specific to the capabilities of Satellite System 300 but not pertinent to the present invention and therefore not detailed here.

At Step 815, the Broadcast Receiver Controller 352 may determine at each instant when a burst may occur according to the native timing of Satellites 1204, whether a burst has in fact been received. If there is no burst, the method follows the No branch of Step 815 and returns to Step 810, repeating itself indefinitely as necessary. At this point Process 800 may assume that Broadcast Receiver 1205 has no knowledge of any low power sleep cycles for any configured broadcast groups, so the Broadcast Receiver 1205 does not yet enter a sleep mode between burst transmission opportunities.

If a burst is received, Process 800 may follow the Yes branch from Step 815 to Step 820, in which the Broadcast Receiver Controller 352 of the Broadcast Receiver 1205 interprets the received burst according to the information in Group Header 701 and, if applicable, Content Header 720. Again, details of reassembly and sequencing, if used at all, are specific to a particular implementation and depend on Satellite System 300 as well as overall service requirements, and are not aspects of the present invention. Step 825, via Broadcast Receiver Controller 352, may then test whether a complete broadcast has been received correctly, according to criteria associated with the segmentation and sequencing protocol used in a particular embodiment. If not, considering that Process 800 either still has no information about any low power sleep cycles or is ignoring them while a series of bursts is expected for reassembly into a complete broadcast, Process 800 may again follow the No path from Step 825 and return to Step 810, repeating itself indefinitely as necessary. If, however, a complete broadcast has been received at this point, Process 800 will follow the Yes branch from Step 825 to Step 830, in which the Broadcast Receiver 1205 may interprets the received broadcast according to rules associated with the broadcast group and, if required, present the received broadcast content to the user of Broadcast Receiver 1205.

Moving on to Step 840 then, the Broadcast Receiver Controller 352 executing Process 800 can determine the interval and epoch time associated with the broadcast group, either using the values sent in the burst as described above or using some a priori knowledge configured into the Broadcast Receiver 1205 executing the process, compute the next wakeup time associated with this interval and epoch pair, and enter that time into a list containing all the wakeup times at which the next burst is expected for every subscribed broadcast group. Note that, depending on how much time the hardware of Broadcast Receiver 1205 needs to prepare for receiving a burst, the computed wakeup time may be some time before the actual transmission epoch time. At Step 850, then, the Broadcast Receiver Controller 352 executing Process 800 may select from the list containing all the wakeup times a next wakeup time to occur—that is, the wakeup time occurring soonest in time—and goes to sleep in a low power mode until that wakeup time. At Step 860, when the appointed wakeup time arrives, the Broadcast Receiver Controller 352 executing Process 800 may then wake up a Broadcast Receiver 1205, initiate powering of the necessary hardware, tune to the channel on which the Broadcast Receiver 1205 expects broadcast bursts to be transmitted, and look for a burst to occur at the epoch time. In Step 865, if a burst is received, the Broadcast Receiver Controller 352 executing Process 800 can follow the Yes path up to Step 820 and proceed to interpret the burst as previously described. If not, Process 800 can follow the No branch back to Step 840 where the Broadcast Receiver 1205 can reset the wakeup time for this group, pick the next wakeup time, and go back to sleep.

One skilled in the art may observe that the method disclosed herein expects multi-burst broadcasts to be transmitted closely in time, with the first burst of a set occurring at the epoch time of a low power sleep cycle and subsequent bursts occurring as soon as possible thereafter. An alternate embodiment may use a different method requiring each burst of a multi-burst broadcast to occur on the low power sleep cycle epoch, thereby spreading the broadcast delivery over multiple cycle times. Selection of one approach over the other would occur based on system characteristics and service goals in a specific implementation embodying the present invention. An implementation may also choose not to allow multi-burst broadcasts for groups using a low power sleep cycle, thereby ensuring that complete and useful information is delivered in each burst. Whichever approach is used, the behavior of Scheduler 1232 in Broadcast Controller 1202 must match the Broadcast Receiver 1205 so bursts will be provided when they are expected.

The invention has been described above with reference to preferred embodiments and specific applications. It is not intended that the invention be limited to the specific embodiments and applications shown and described, but that the invention be limited in scope only by the claims appended hereto. It will be evident to those skilled in the art that various substitutions, modifications, and extensions may be made to the embodiments as well as to various technologies which are utilized in the embodiments. It will also be appreciated by those skilled in the art that such substitutions, modifications, and extensions fall within the spirit and scope of the invention, and it is intended that the invention as set forth in the claims appended hereto includes all such substitutions, modifications, and extensions.

What is claimed is:

1. A satellite receiver, comprising:
    a satellite receiver controller to retrieve a transmission interval and an epoch time from a wakeup list, select a next wakeup time, enter a sleep mode according to said transmission interval, exit said sleep mode according to said transmission interval, and receive a satellite transmission according to said epoch time;
    wherein said transmission interval is an amount of time said satellite receiver is to remain in said sleep mode between expected transmissions and said epoch time is an instant, after the satellite receiver awakes from the sleep mode, at which said satellite receiver expects broadcasts to be transmitted.

2. The satellite receiver according to claim 1, further comprising:
    a reception module to receive a satellite transmission including said transmission interval and said epoch time;
    wherein said satellite receiver controller enters said transmission interval and said epoch time in said wakeup time list.

3. The satellite receiver according to claim 1, wherein an epoch selector at a remote broadcast controller determines a least-loaded epoch time as a basis for selecting said epoch time.

4. The satellite receiver according to claim 3, wherein said epoch selector selects said epoch time based on a number of broadcast groups utilizing said epoch time.

5. The satellite receiver according to claim 3, wherein said epoch selector selects said epoch time based on an intersection of available epoch times according to said transmission interval and one or more in-use epoch times.

6. The satellite receiver according to claim 3, wherein said epoch selector selects said epoch time for a broadcast group.

7. The satellite receiver according to claim 1, wherein an interval selector at a remote broadcast controller determines said sleep mode cycle based on a native time scale of said satellite system.

8. A satellite receiver communication method, comprising:
    retrieving, with a satellite receiver controller of said satellite receiver, a transmission interval and an epoch time from a wakeup list, said transmission interval being an amount of time said satellite receiver is to remain in a sleep mode between expected transmissions and said epoch time being an instant, after the satellite receiver awakes from the sleep mode, at which said satellite receiver expects broadcasts to be transmitted;
    entering said sleep mode according to said transmission interval;
    exiting said sleep mode according to said transmission interval; and
    receiving a satellite transmission according to said epoch time.

9. The satellite receiver communication method according to claim 8, further comprising:
    receiving a satellite transmission including said transmission interval and said epoch time; and
    entering said transmission interval and said epoch time in said wakeup time list.

10. The satellite receiver communication method according to claim 8, further comprising determining, via a remote broadcast controller, a least-loaded epoch time as a basis for selecting said epoch time.

11. The satellite receiver communication method according to claim 8, wherein said epoch time is selected based on a number of broadcast groups utilizing said epoch time.

12. The satellite receiver communication method according to claim 8, wherein said epoch time is selected based on an intersection of available epoch times according to said transmission interval and one or more in-use epoch times.

13. The satellite receiver communication method according to claim 8, wherein said epoch time is selected for a broadcast group.

14. The satellite receiver communication method according to claim 8, further comprising determining said sleep mode cycle based on a native time scale of said satellite system.

* * * * *